United States Patent [19]
Tashjian

[11] 3,765,047
[45] Oct. 16, 1973

[54] COMBINED SOLDERING GUN SUPPORT AND TIP CLEANER

[76] Inventor: Artin Tashjian, 43-05 44th Street, New York, N.Y. 11104

[22] Filed: Mar. 6, 1972

[21] Appl. No.: 231,879

[52] U.S. Cl.................. 15/118, 15/104.92, 228/57, 248/176
[51] Int. Cl............................ B08b 1/04, B23k 3/00
[58] Field of Search..................... 15/104 R, 104.92, 15/105, 118, 218.1, 423; 219/242; 228/57; 248/44, 117.1, 117.2, 117.3, 117.4, 117.6, 117.7, 176

[56] References Cited
UNITED STATES PATENTS

| | | | |
|---|---|---|---|
| 1,737,081 | 11/1929 | Foucher............................ | 248/117.4 |
| 1,951,441 | 3/1934 | Rock............................. | 219/242 UX |
| 2,174,230 | 9/1939 | Shangle............................. | 248/176 |
| 2,410,534 | 11/1946 | Trevino......................... | 248/117.2 X |
| 2,666,606 | 1/1954 | Steen............................. | 248/117.6 |
| 3,294,348 | 12/1966 | Cerisano......................... | 248/176 X |
| 3,609,791 | 10/1971 | Siegel et al........................ | 15/114 |

FOREIGN PATENTS OR APPLICATIONS 186,506  12/1963  Sweden............................. 248/176

*Primary Examiner*—Daniel Blum
*Attorney*—Morton Amster et al.

[57] ABSTRACT

A soldering gun support for mounting on work benches which is adjustable to receive soldering guns of various sizes. Mounted on the soldering gun support are adjustable clamp members and a device for cleaning the tip of the soldering gun.

4 Claims, 4 Drawing Figures

Patented Oct. 16, 1973 3,765,047
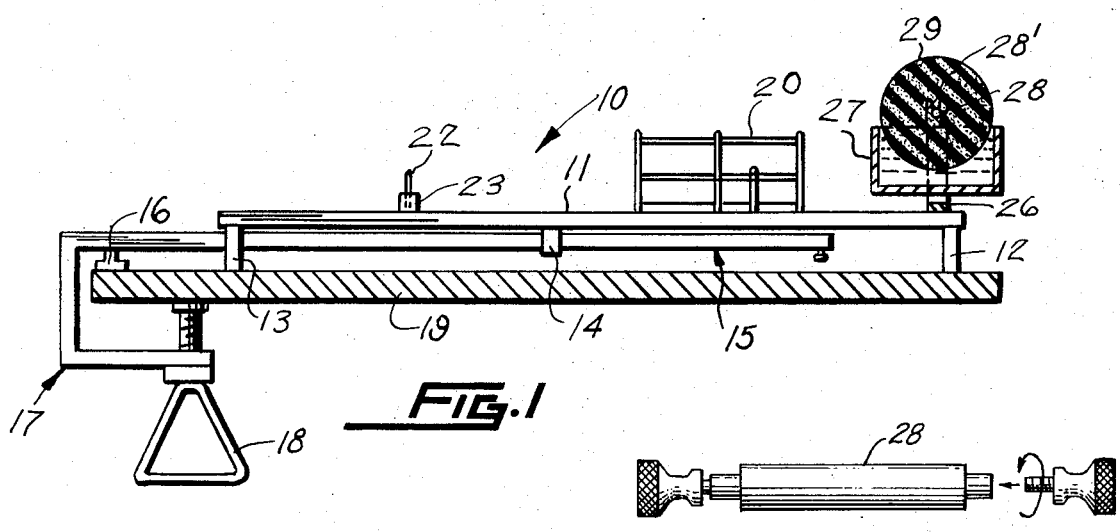
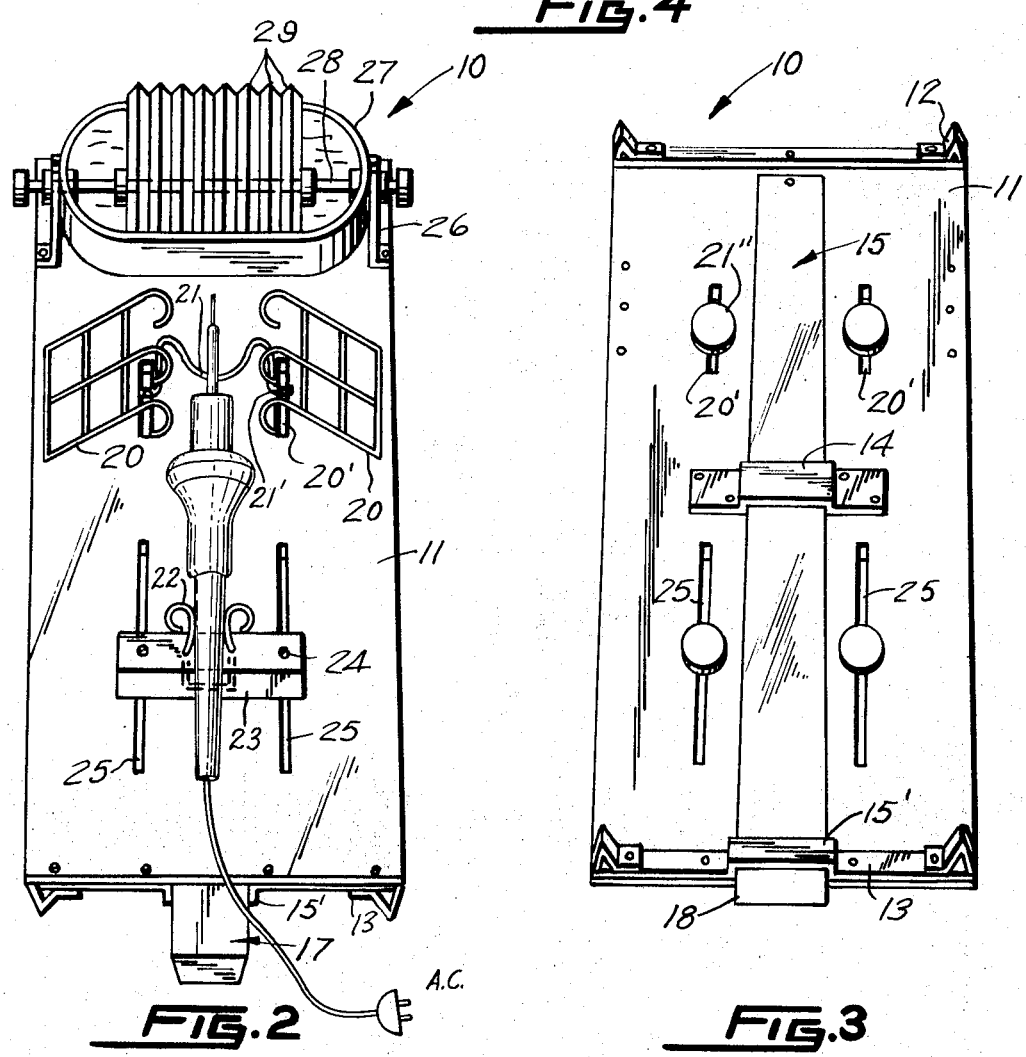
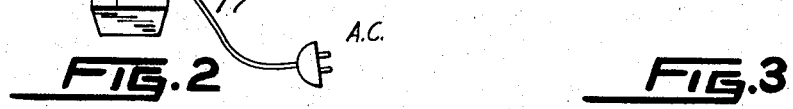

COMBINED SOLDERING GUN SUPPORT AND TIP CLEANER

This invention relates to work shop devices, such as a soldering gun support.

It is therefore the primary purpose of this invention to provide a support device which will be held in clamping engagement with the work bench and the device will be adjustable in length so as to accommodate the various soldering guns.

Another object of this invention is to provide a soldering gun support which will have adjustable members to support the soldering gun and a clamp portion of the device will be integral with a base portion thereof.

A further object of this invention is to provide a soldering gun support device which will have wings with sponges for enabling the user to clean the soldering tip of the gun placed thereon.

Other objects of the present invention are to provide a soldering gun support which is simple in design, inexpensive to manufacture, rugged in construction, easy to use and efficient in operation.

These and other objects will be readily evident upon a study of the following specification and the accompanying drawing wherein:

FIG. 1 is a side view of the present invention shown partly broken away;

FIG. 2 is a perspective view showing the top surface of FIG. 1; and

FIG. 3 is a perspective view showing the bottom of the device.

FIG. 4 is a view illustrating a means for enabling the sponge shaft to be removed.

According to this invention, a soldering gun support 10 is shown to include a plate member 11 having secured to it leg portions 12 and 13 by suitable fasteners.

Also secured to the bottom of plate 11 is a bracket 14 and a bracket portion 15' in which an elongated member 15 is slideable. The support bar 16 for U-shaped end 17 of member 15 serves to cooperate with the screw clamp 18 for tightening device 10 to the bench 19.

A pair of lattice members 20 are faced toward each other and in cooperation with member 21 will accommodate soldering guns of various sizes and member 21 is adjustable frontwards and rearwards by means of pin 21' which is slideable within slots 20'. A disc 21" secured to pin 21' will prevent the dislodging of member 21.

A second wire member 22 is rounded on its extending ends and is secured within a block member 23 adding an extending pin 24 near each end. The pins 24 are freely and slideably carried within the slots 25 and thus together with members 20 and 21 will enable device 10 to adapt to various soldering guns (one of which is shown in FIG. 2).

It shall be noted that both the brackets 14 and the bracket portion 15', serve to provide guide means for the slideable member 15.

A pair of brackets 26 are fixedly secured to the top of plate 11 by suitable fasteners and brackets 26 provide support means for the reservoir 27 which carries water for aiding and cleaning the tip of the soldering guns.

A shaft 28 is supported within the openings 28' of brackets 26 and carried removably thereon, are disc sponges 29 which the soldering gun tip is brought to bear on when cleaning the top thereof.

In use, the screw clamp 18 is used in a well known manner to tighten member 15 to the bench 19 and the length of device 10 is adjustable forwardly and rearwardly by pushing the plate 11 relative to member 15 prior to the device 10 being secured by screw clamp 18 to the bench 19.

The members 21, 20, and 22 are adjustable so as to accommodate soldering guns of various sizes and the tip of the soldering guns are placed upon the sponges 29 which will clean the tip when desired.

What I now claim is:

1. A soldering gun support device, comprising an elongated flat plate, a movable member carried by said plate for adjusting the length of the support, first bracket means carried by said plate for holding the plate and member together, a screw clamp member carried by one of said plate or member providing a means of securing said device to a work bench, slidable members carried by said plate providing accommodation means for various size soldering guns, means carried by said plate for supporting said plate above said work bench, and second bracket means carried by said plate supporting reservoir and sponge means for cleaning the soldering gun tips.

2. The combination according to claim 1, wherein said first bracket means are secured fixedly to the bottom of said plate and said first bracket means provide a guide means for said movable member having said screw clamp member.

3. The combination according to claim 2, wherein said second bracket means which are supporting said reservoir are secured fixedly to the top side of said plate near the end opposite said screw clamp member and further include reservoir supporting brackets, shaft means carried by said reservoir supporting brackets which are removably received within slotted ends formed in said reservoir supporting brackets and said shaft means removably mount sponge members for bearing against said soldering tips in order to clean said tips.

4. The combination according to claim 3, wherein one of said slideable members includes a pair of wire lattices secured to pin means carried within elongated slots of said plate, said slots being parallel to each other, and disc means on the pin means for retaining the lattices on said device.

* * * * *